United States Patent [19]

Moriwaki et al.

[11] Patent Number: 4,938,900
[45] Date of Patent: Jul. 3, 1990

[54] METHOD FOR THE PREPARATION OF MICROCAPSULES

[75] Inventors: Masafumi Moriwaki, Uenohara; Kei Etoh, Tokyo; Hiroyuki Sekihara, Hino, all of Japan

[73] Assignee: Toppan Moore Co., Ltd., Tokyo, Japan

[21] Appl. No.: 174,039

[22] Filed: Mar. 28, 1988

[51] Int. Cl.$^5$ ............................................. B01J 13/02
[52] U.S. Cl. ...................................... 264/4.1; 264/4.7; 428/402.21
[58] Field of Search ................... 264/4.7, 4.3, 4.1; 427/213.34

[56] References Cited

U.S. PATENT DOCUMENTS

| | | | |
|---|---|---|---|
| 3,886,084 | 5/1975 | Vassiliades | 264/4.1 |
| 4,233,178 | 11/1980 | Fuchigami | 264/4.7 |
| 4,328,119 | 5/1982 | Iwasaki et al. | 264/4.7 |
| 4,444,699 | 4/1984 | Hayford | 264/4.7 |
| 4,501,809 | 2/1985 | Hiraishi et al. | 430/235 |
| 4,525,520 | 6/1985 | Shioi et al. | 264/4.7 |
| 4,533,599 | 8/1985 | Okumura et al. | 428/402.21 |
| 4,601,863 | 7/1986 | Shioi et al. | 264/4.7 |

OTHER PUBLICATIONS

Derwent Abstract Accession, No. 88-157709/23, Japanese Pat. No. 63097223-A, Apr. 27, 1988.
Offenlegungsschrift 28 32 637; Publication Date Feb. 2, 1979; Priority Date (Japan) Jul. 27, 1977.

*Primary Examiner*—John F. Terapane
*Assistant Examiner*—John M. Covert
*Attorney, Agent, or Firm*—Wyatt, Gerber, Burke and Badie

[57] ABSTRACT

Microcapsules are prepared by adding a methylolated melamine or methylolated urea to an aqueous emulsion of the core material dispersed in an aqueous solution of a styrene/maleic anhydride copolymer partially hydrolyzed in an alkaline condition and heating the mixture at 40° to 90° C. in an acidic condition so that a reaction product forming the capsule walls is produced by the esterification reaction between the carboxyl groups in the partial hydrolysis product and the methylol groups in the methylolated melamine or urea and the amidation reaction between the carboxylic anhydride groups in the former and the amino groups in the latter. By virtue of the three dimensional network structure, the capsule walls are very dense and highly resistant against heat, water and solvents.

7 Claims, No Drawings

METHOD FOR THE PREPARATION OF MICROCAPSULES

BACKGROUND OF THE INVENTION

The present invention relates to a method for the preparation of microcapsules having excellent properties or, more particularly, to a novel method for the preparation of dense microcapsules having excellent heat resistance, water resistance and solvent resistance by the method of so-called in situ formation.

As is known, microcapsules are widely used as a coating material of pressure-sensitive transfer paper and as a mounting medium of medicines, agricultural chemicals, perfumes, adhesives, activated charcoals, enzymes, dyes, solvents and the like.

Hitherto known methods for the preparation of microcapsules include so-called coacervation method, interfacial polymerization method, in situ method and others, of which the in situ method is promising in most cases in respect of the low manufacturing costs in a relatively simple procedure in addition to the versatility relative to the type of the core material to be encapsulated.

Microcapsule products are required in recent years to have upgraded performance in the resistance against high temperature, high humidity and solvents as well as extended durability. These requirements are partly satisfied by the in situ method in which the capsule walls are formed from an amino resin. For example, a proposal has been made in Japanese Patent Kokai No.53-84881 for the method in which the capsule walls of a melamine-formaldehyde resin is formed in the presence of a copolymer of an ethylenically unsaturated monomer and maleic anhydride. Further, Japanese Patent Publication No. 60-2100 discloses a method for forming capsule walls of a melamine-formaldehyde resin in an acidic aqueous solution of a copolymer of styrene and maleic anhydride.

Though excellent in the resistance against heat, water and solvents, the capsule walls of a melamine-formaldehyde resin formed in these prior art methods sometimes cause troubles due to their poor denseness that leakage of the core material inside takes place out of the microcapsules and the core material is denatured by water or solvent permeating into the microcapsules through the capsule walls.

An alternative method is proposed in Japanese Patent Kokai No. 51-144383 according to which an oleaginous material is coated with a coating material prepared in advance from a condensation product of formaldehyde and a hydroxy-containing polymer or a copolymer of an ethylenically unsaturated monomer and maleic anhydride. This method is also not quite effective when capsule walls having high denseness are desired.

SUMMARY OF THE INVENTION

The present invention accordingly has an object to provide a novel and simple in situ method for the preparation of microcapsules having high denseness of the capsule walls along with excellent resistance against heat, water and solvents.

The starting material for forming the capsule walls used in the inventive in situ method comprises a copolymer of styrene and maleic anhydride partially hydrolyzed in an alkaline condition and a methylolated melamine or methylolated urea.

Thus, the method of the present invention for the preparation of microcapsules comprises the successive steps of:

(a) partially hydrolyzing a copolymer of styrene and maleic anhydride in an alkaline aqueous medium in a degree of hydrolysis of 10 to 80% by moles to give an aqueous solution of a partial hydrolysis product;

(b) dispersing a core material of the microcapsules into the aqueous solution of the partial hydrolysis product to form an aqueous emulsion;

(c) adding a methylolated melamine or a methylolated urea to the aqueous emulsion; and (d) heating the aqueous emulsion in an acidic condition to form a film on the particles of the core material dispersed therein.

DETAILED DESCRIPTION OF THE PREFERRED EMBODIMENTS

In the first step of the inventive method, a copolymer of styrene and maleic anhydride is partially hydrolyzed in an alkaline aqueous medium to give an aqueous solution of the partial hydrolysis product of the copolymer. The molar ratio of the styrene moiety and the maleic anhydride moiety in the copolymer used in the inventive method is in the range from 5:1 to 1:5 or, preferably, in the range from 2:1 to 1:2. The partial hydrolysis of the copolymer must be performed under an alkaline condition. When the partial hydrolysis of the copolymer is performed under an acidic condition, the product of microcapsules has poor properties not to achieve the object of the invention. The hydrolysis of the copolymer is performed to such an extent to give a degree of hydrolysis of 10 to 80% by moles or, preferably, 20 to 60% by moles. When the degree of hydrolysis is too low, the reaction between the partially hydrolyzed copolymer and the methylolated melamine or methylolated urea proceeds only incompletely so that the capsule walls of the microcapsule product have poor denseness. When the degree of hydrolysis is too high, on the other hand, difficulties are caused in the formation of microcapsules so that the microcapsules, if obtained, would have poor properties.

The partially hydrolyzed copolymer of styrene and maleic anhydride not only serves as a reactant to react with the methylolated melamine or methylolated urea but also plays a role as an emulsifying agent or catalyst in the formation of the microcapsule walls.

The partially hydrolyzed copolymer of styrene and maleic anhydride can be obtained easily by dissolving or dispersing a copolymer of styrene and maleic anhydride in water, adding an appropriate amount of an alkali to the solution or dispersion and keeping the aqueous solution or dispersion under agitation at a temperature of 20 to 100° C. Suitable alkaline compounds used here include sodium hydroxide, potassium hydroxide, ammonium hydroxide, sodium carbonate, sodium metasilicate, sodium phosphate, ammonium phosphate, morpholine and the like though not limitative thereto. The degree of hydrolysis of the copolymer is dependent on the kind and amount of the alkaline compound, reaction temperature, reaction time and other reaction conditions so that these parameters should be adequately selected as so to obtain the degree of hydrolysis as desired.

The partially hydrolyzed copolymer of styrene and maleic anhydride in the form of an aqueous solution is subsequently reacted with a methylolated melamine or a methylolated urea. Suitable methylolated melamine includes monomethylol melamine, dimethylol melamines, trimethylol melamines, tetramethylol melamines, pentamethylol melamine and hexamethylol melamine. Suitable methylolated urea includes monomethylol urea, dimethylol urea, trimethylol urea and tetramethylol urea. Water-soluble methylolated melamines having a relatively small number, e.q., 2 to 4, of the methylol groups in a molecule are preferred in respect of the reactivity with the partially hydrolyzed copolymer of styrene and maleic anhydride. These methylolated melamines and methylolated ureas can be used either singly or as a combination of two kinds or more according to need.

The methylolated melamine or urea can be prepared according to a known method. For example, 1 mole of melamine or urea in an aqueous medium is admixed with at least 1.5 moles or, preferably, with 2 to 4 moles of formaldehyde and reacted therewith for 10 to 60 minutes at a temperature of 50 to 100° C. with the value of pH of the aqueous medium adjusted to 8 to 10. It is of course that the methylolation reaction carried out in this manner usually leads to two kinds or more of the methylolated compounds having different degrees of methylolation. In the inventive method, any mixture of different methylolated melamines or ureas thus produced can be used as such without separation into the individual species.

The method of the present invention is applicable to any core material, i.e. the material to be encapsulated in the microcapsules, including liquid and solid ones hitherto successfully encapsulated in microcapsules. Core materials encapsulatable according to the inventive method include various kinds of inks, medicines, agricultural chemicals, perfumes, adhesives, dyes, solvents, catalysts, enzymes and so on.

Following is a description of a typical and preferable embodiment of the inventive method. In the first place, a copolymer of styrene and maleic anhydride is added to and dispersed in an aqueous medium and, after addition of an appropriate amount of an alkaline compound, the dispersion is kept with agitation at a temperature of 20 to 100° C. to effect the hydrolysis reaction of the copolymer until a desired degree of hydrolysis is obtained. The thus obtained aqueous solution is then adjusted to have a concentration of the partial hydrolysis product of the copolymer in the range from 0.5 to 20% by weight. Thereafter, a core material is added and emulsified or dispersed in the aqueous solution by vigorously agitating or by applying ultrasonic waves. The amount of the core material is preferably in the range from 5 to 50 times by weight based on the amount of the partially hydrolyzed copolymer of styrene and maleic anhydride contained in the aqueous solution.

Separately, a methylolated melamine or methylolated urea in the form of an aqueous solution is prepared by adding melamine or urea to formalin having a pH of 8 to 10 as adjusted by the addition of an alkali and heating the mixture at a temperature of 50 to 100° C.

In the next place, the thus prepared aqueous solution of the methylolated melamine or urea is added to the aqueous emulsion or dispersion of the core material in an aqueous medium containing the partially hydrolyzed copolymer of styrene and maleic anhydride and the mixture is agitated for 30 to 120 minutes at a temperature of 40 to 90° C. to effect the reaction between the methylolated melamine or urea and the partially hydrolyzed copolymer. The aqueous mixture should have a pH of 3 to 7 or, preferably, 5.0 to 6.5 so that, if necessary, an acid, such as citric acid, is added thereto beforehand. The amount of the methylolated melamine or methylolated urea should be in the range from 10 to 100 parts by weight per 100 parts by weight of the partially hydrolyzed copolymer of styrene and maleic anhydride.

When the reaction between the methylolated melamine of urea and the partially hydrolyzed copolymer is effected in the above described manner, the particles of the core material are encapsulated by a film of the reaction product to serve as the capsule walls. The reaction product has a three-dimensional network structure with two types of chemical bonds including the ester linkages formed between the carboxyl groups as a result of the hydrolysis of the styrene/maleic anhydride copolymer and the methylol groups in the methylolated melamine or urea and the amide linkages formed between the residual —CO—O—CO— groups in the partially hydrolyzed copolymer and the amino groups in the methylolated melamine or urea. Therefore, the thus obtained capsule walls have excellent resistance against heat, water and solvents as well as high denseness. Accordingly, the microcapsules prepared according to the inventive method provide a very safe and reliable means to provide various kinds of chemical substances such as inking materials on recording media, medicines, agricultural chemicals, perfumes, adhesives, foods, dyes, solvents, catalysts, enzymes and the like.

In the following, the method of the present invention is described in more detail by way of examples which should not be construed to limit the scope of the invention in any way.

In the Examples and Comparative Examples described below, evaluation was made of the solvent resistance and heat resistance of the microcapsules according to the following procedures.

Solvent resistance: the microcapsules prepared in the form of an aqueous suspension were collected by filtration through a membrane filter of 0.42 μm pore opening followed by drying and a 0.1 g portion of the thus obtained dried microcapsules was added to and dispersed in 20 ml of a solvent at 40° C. in an ultrasonic cleaner taking 60 minutes followed by the gas chromatographic determination of the concentration of the core material in the solvent as leached out of the microcapsules to calculate the overall leached amount as a measure of the solvent resistance.

Heat resistance: a 0.5 g portion of the dried microcapsules was kept for 60, 90 or 120 minutes in a hot air oven at 150° C. to determine the weight loss in % as a measure of the heat resistance.

EXAMPLE 1

An aqueous solution containing 5% by weight of a partially hydrolyzed copolymer of styrene and maleic anhydride was prepared by heating 100 g of a copolymer of styrene and maleic anhydride in a molar ratio of 1:1 (Scriptset 520, a product by Monsanto Co.) and 0.17 mole of sodium hydroxide in water. The degree of hydrolysis of the copolymer was 20%. An aqueous emulsion was prepared by dispersing 200 g of dimethyl phthalate in 300 g of the above prepared aqueous solution. The average particle diameter of the emulsion was 4 to 5 μm.

Separately, 75 g of a 37% formalin having a pH of 9 with addition of a 20% by weight aqueous solution of sodium hydroxide were admixed with 30 g of melamine under agitation at 80° C.

When the melamine was completely dissolved to give a clear aqueous solution of methylolated melamine having a degree of methylolation of 2.5 to 3.5, the solution was poured into the above prepared aqueous emulsion of dimethyl phthalate and agitated for about 120 minutes at 80° C. to effect the reaction between the methylolated melamine and the partially hydrolyzed copolymer of styrene and maleic anhydride in the aqueous medium having a pH adjusted to 5.2 so that microcapsules were obtained with the reaction product forming the capsule walls.

The microcapsules were subjected to the test of solvent resistance and heat resistance to give the results shown in the table below.

EXAMPLES 2 to 4

Products of microcapsules were prepared in substantially the same manner as in Example 1 except that the amount of sodium hydroxide used in the partial hydrolysis of the styrene/maleic anhydride copolymer was increased to 0.25 mole, 0.50 mole and 0.75 mole to give degrees of hydrolysis of 30%, 40% and 75% in Examples 2, 3 and 4, respectively. The aqueous media in which the reaction of the partially hydrolyzed copolymer and the methylolated melamine had values of pH of 5.5, 5.8 and 6.5 in Examples 2, 3 and 4, respectively.

These microcapsule products were subjected to the test of solvent resistance and heat resistance to give the results shown in the table.

EXAMPLE 5

A microcapsule product was prepared in substantially the same procedure as in Example 1 excepting replacement of the aqueous solution of methylolated melamine used in Example 1 with an aqueous solution of a methylolated urea which was obtained by mixing an aqueous solution of 20 g of urea and 2 g of resorcin in 100 g of water and 75 g of a 37% formalin having a PH of 9 with addition of a 20% by weight aqueous solution of sodium hydroxide and heating the mixture at 80° C. to effect the methylolation reaction. The aqueous medium in which the partially hydrolyzed copolymer and the methylolated urea had a pH of 6.5.

The test for solvent resistance and heat resistance was undertaken of the thus prepared microcapsule product having capsule walls of the reaction product between the methylolated urea and the partially hydrolyzed copolymer of styrene and maleic anhydride to give the results shown in the table.

Comparative Example 1

A product of microcapsules having capsule walls of a melamine-formaldehyde resin was prepared in substantially the same manner as in Example 1 exceptinq replacement of the aqueous solution of a methylolated melamine used in Example 1 with 115 g of a melamine resin (Sumirez 607, a product by Sumitomo Chemical Co.). The partially hydrolyzed copolymer of styrene and maleic anhydride had a degree of hydrolysis of 30% and the aqueous medium in which the reaction of the partially hydrolyzed copolymer and the melamine resin had a pH of 5.5.

The microcapsule product was subjected to the test of solvent resistance and heat resistance to give the results shown in the table.

Comparative Example 2

A product of microcapsules was prepared in substantially the same manner as in Example 1 except that the amount of sodium hydroxide used in the partial hydrolysis of the styrene/maleic anhydride copolymer was increased to 2.0 moles so that the degree of hydrolysis of the copolymer was 90%. The reaction of the partially hydrolyzed copolymer and the methylolated melamine was performed in an aqueous medium having a pH of 8.2.

The microcapsule product was subjected to the test of solvent resistance and heat resistance to give the results shown in the table.

Comparative Example 3

An aqueous solution of a partially hydrolyzed styrene/maleic anhydride copolymer having a degree of hydrolysis of 5% in a concentration of 5% by weight was prepared by dissolving 100 g of the same copolymer as used in Example 1 in water together with 0.05 mole of sodium hydroxide. An aqueous emulsion of dimethyl phthalate, of which the particles had an average diameter of about 4 to 5 $\mu$m, was prepared by dispersing 100 g of dimethyl phthalate in a 100 g portion of the above prepared aqueous solution of the copolymer.

Separately, an aqueous solution of a methylolated melamine was prepared by adding 10 g of melamine and 25 g of a 37% formalin to 65 g of water followed by adjustment of the pH to about 9 with addition of sodium hydroxide and heating the mixture at 60° C.

The aqueous solution of methylolated melamine was added to the aqueous emulsion of dimethyl phthalate and the mixture having a pH adjusted to 4.5 was heated at 60° C. with agitaiton to give microcapsules of which the capsule walls were formed of a melamine-formaldehyde resin.

The microcapsule product was subjected to the test of solvent resistance and heat resistance to give the results shown in the table.

TABLE

| | Solvent resistance, %, in | | | Heat resistance, %, after | | |
|---|---|---|---|---|---|---|
| | tetra-hydro-furan | ethyl acetate | methyl alcohol | 60 minutes | 90 minutes | 120 minutes |
| Example 1 | 3.0 | 3.6 | 17.5 | 2.7 | 3.5 | 4.0 |
| Example 2 | 2.9 | 2.5 | 11.5 | 3.4 | 4.3 | 4.6 |
| Example 3 | 1.4 | 1.2 | 14.4 | 3.9 | 4.4 | 4.7 |
| Example 4 | 4.7 | 5.9 | 30.0 | 13.8 | 13.9 | 16.6 |
| Example 5 | 6.3 | 6.7 | 43.8 | 7.3 | 9.5 | 15.3 |
| Comparative Example 1 | 76.1 | 79.6 | 100 | 52.2 | 64.6 | 80.6 |
| Comparative Example 2 | 100 | 100 | 100 | 52.2 | 64.6 | 80.6 |
| Comparative Example 3 | 17.3 | 29.4 | 100 | 16.7 | 20.5 | 48.3 |

As is understood from the results shown in the table above, the products of microcapsules prepared according to the inventive method, which have capsule walls of a reaction product of an amino resin and a partially hydrolyzed copolymer of styrene and maleic anhydride, have greatly improved resistance against heat, water and solvents along with outstanding denseness of the capsule walls in comparison with conventional microcapsule products having capsule walls of an amino resin.

Reference Example

Following experiments were undertaken with an object to demonstrate that the capsule walls of the microcapsules prepared according to the inventive method were formed of a reaction product of the partially hydrolyzed copolymer of styrene and maleic anhydride and the methylolated melamine or methylolated urea.

Each of the microcapsule products prepared in the above described Examples 1 to 5 was dried and converted into a powdery form, which was subjected to a washing treatment by repeating 5 cycles of dispersion in a 5% aqueous solution of sodium hydroxide and removal of the liquid portion by centrifugation.

This treatment was effective to completely hydrolyze the ester linkages in the capsule walls of the reaction product between the partially hydrolyzed styrene/maleic anhydride copolymer and the methylolated melamine or methylolated urea to leave only the amide linkages formed between the carboxylic anhydride groups —CO—O—CO— and the amino groups.

The thus treated powdery sample was subjected to the measurement of the infrared absorption spectrum to find a characteristic absorption band at a wave number of 810 cm$^{-1}$, which could be found in the spectrum of melamine resins but could not be found in the spectrum of styrene/maleic anhydride copolymers, and a characteristic absorption band at a wave number of 700 cm$^{-1}$, which could be found in the spectrum of styrene/maleic anhydride copolymers but could not be found in the spectrum of melamine resins. Namely, each of the infrared absorption spectra of the samples from Examples 1 to 5 had absorption bands at wave numbers of both 810 cm$^{-1}$ and 700 cm$^{-1}$ while the absorption band at 700 cm$^{-1}$ could not be found at all in the infrared absorption spectrum of a sample prepared from microcapsules having capsule walls of a melamine resin alone to which the absorption band at 810 cm$^{-1}$ could be assigned.

The above described results of the infrared absorption spectrophotometry support the conclusion that the capsule walls of the microcapsules prepared according to the inventive method are formed of the reaction product between the partially hydrolyzed copolymer of styrene and maleic anhydride and the methylolated melamine or methylolated urea.

What is claimed is:

1. A method for the preparation of microcapsules which comprises the successive steps of:
   (a) partially hydrolyzing a copolymer of styrene and maleic anhydride in an alkaline aqueous medium in a degree of hydrolysis of 10 to 80% by moles to give an aqueous solution of a partial hydrolysis product of the copolymer;
   (b) dispersing a core material of the microcapsules into the aqueous solution of the partial hydrolysis product of the copolymer to form an aqueous emulsion;
   (c) adding a methylolated melamine or a methylolated urea to the aqueous emulsion; and
   (d) heating the aqueous emulsion in an acidic condition to effect the reaction between the partial hydrolysis product of the copolymer and the methylolated melamine or the methylolated urea forming a film of the reaction product on the particles of the core material dispersed in the aqueous emulsion.

2. The method for the preparation of microcapsules as claimed in claim 1 wherein the copolymer of styrene and maleic anhydride is composed of the styrene moiety and maleic anhydride moiety in a molar ratio in the range from 5:1 to 1:5.

3. The method for the preparation of microcapsules as claimed in claim 1 wherein the aqueous solution prepared in step (a) contains from 0.5 to 20% by weight of the partial hydrolysis product of the copolymer.

4. The method for the preparation of microcapsules as claimed in claim 1 wherein the amount of the core material added to the aqueous solution in step (b) is in the range from 5 to 50 times by weight based on the amount of the partial hydrolysis product of the copolymer.

5. The method for the preparation of microcapsules as claimed in claim 1 wherein the amount of the methylolated melamine or methylolated urea added to the aqueous emulsion in step (c) is in the range from 10 to 100 parts by weight per 100 parts by weight of the partial hydrolysis product of the copolymer.

6. The method for the preparation of microcapsules as claimed in claim 1 wherein the aqueous emulsion heated in step (d) has a pH in the range from 3 to 7.

7. The method for the preparation of microcapsules as claimed in claim 1 wherein the aqueous emulsion is heated in step (d) at a temperature in the range from 40 to 90° C. for a length of time in the range from 30 to 120 minutes.

* * * * *